United States Patent
Shibagami

(10) Patent No.: US 11,036,287 B2
(45) Date of Patent: Jun. 15, 2021

(54) ELECTRONIC DEVICE, CONTROL METHOD FOR ELECTRONIC DEVICE, AND NON-TRANSITORY COMPUTER READABLE MEDIUM

(71) Applicant: CANON KABUSHIKI KAISHA, Tokyo (JP)

(72) Inventor: Genjiro Shibagami, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/364,573

(22) Filed: Mar. 26, 2019

(65) Prior Publication Data
US 2019/0310702 A1   Oct. 10, 2019

(30) Foreign Application Priority Data

Apr. 4, 2018   (JP) .............................. JP2018-072212

(51) Int. Cl.
*G06F 3/01* (2006.01)
*G06F 3/0346* (2013.01)
*G02B 27/01* (2006.01)
*G06F 3/0488* (2013.01)

(52) U.S. Cl.
CPC ........... *G06F 3/012* (2013.01); *G02B 27/017* (2013.01); *G06F 3/0346* (2013.01); *G06F 3/0488* (2013.01); *G02B 2027/014* (2013.01); *G02B 2027/0138* (2013.01); *G02B 2027/0187* (2013.01)

(58) Field of Classification Search
CPC ...... G06F 3/012; G06F 3/0346; G06F 3/0488; G02B 27/017; G02B 2027/0138; G02B 2027/014; G02B 2027/0187; G06T 3/20; G06T 3/60
See application file for complete search history.

(56) References Cited

U.S. PATENT DOCUMENTS

| | | | |
|---|---|---|---|
| 9,990,032 B2 | 6/2018 | Sakuta et al. | |
| 2009/0021589 A1* | 1/2009 | Okada ...................... | G03B 5/00 348/208.1 |
| 2009/0303204 A1* | 12/2009 | Nasiri ..................... | A63F 13/06 345/184 |
| 2016/0209658 A1* | 7/2016 | Zalewski .................. | G06F 3/01 |

FOREIGN PATENT DOCUMENTS

JP             2015125502 A       7/2015

* cited by examiner

*Primary Examiner* — Jennifer Mehmood
*Assistant Examiner* — Andrew Shin
(74) *Attorney, Agent, or Firm* — Rossi, Kimms & McDowell LLP

(57) ABSTRACT

An electronic device according to the present invention includes at least one processor to perform the operations of: a display control unit configured to control a display device to display a part of an image; and a detection unit configured to detect an orientation change of the display device, wherein the display control unit performs first processing relating to changing a position of a part of the image displayed according to the orientation change if the detected orientation change is a pitch or a yaw, and performs second processing relating to reproduction of the image, the second processing being different from the first processing, if the detected orientation change is a roll.

12 Claims, 6 Drawing Sheets

FIG. 5A

|  | LEFT ROLL | RIGHT ROLL |
|---|---|---|
| FIRST SETTING ITEM | STOP | REPRODUCTION |
| SECOND SETTING ITEM | FAST-REWIND | FAST-FORWARD |

FIG. 5B

|  | LEFT ROLL | RIGHT ROLL |
|---|---|---|
| FIRST SETTING ITEM | IMAGE BACKWARD | IMAGE FORWARD |
| SECOND SETTING ITEM | REDUCTION/MULTI REPRODUCTION | ENLARGEMENT/ ONE-IMAGE REPRODUCTION |

ELECTRONIC DEVICE, CONTROL METHOD FOR ELECTRONIC DEVICE, AND NON-TRANSITORY COMPUTER READABLE MEDIUM

BACKGROUND OF THE INVENTION

Field of the Invention

The present invention relates to an electronic device, a control method for an electronic device, and a non-transitory computer readable medium, and more particularly to a control method for displaying an image having a wide video image range.

Description of the Related Art

In recent years, image capturing apparatuses capable of capturing images having a video image range wider than a human viewing angle, such as omnidirectional images and entire celestial sphere images, have become widespread. Further, a method is known by which display with a high immersion feeling and a sense of presence is performed by displaying a part of an image having such a wide video image range on a display unit and changing the position of the video image range (display range), which is displayed on the display unit following a change in the orientation of the apparatus (Japanese Patent Application Publication No. 2015-125502). A user can obtain a higher immersion feeling and a sense of presence by mounting the apparatus on the head.

SUMMARY OF THE INVENTION

However, the reproduction-related processing (processing related to reproduction) is not merely a display position change processing of changing the position of the display range in accordance with the change in the orientation of the apparatus. Further, when the apparatus is mounted on the head, the user cannot perform an operation for reproduction-related processing that is not the display position change processing, unless the apparatus is removed from the head to enable the operation of the state of the display unit, which is inconvenient.

Accordingly, the present invention provides an electronic device, a control method for an electronic device, and a non-transitory computer readable medium that enable an operation for reproduction-related processing, which is not the display position change processing, in a state where the apparatus is mounted on the head to ensure high immersion feeling and a sense of presence and the like.

An electronic device according to the present invention includes at least one processor to perform the operations of a display control unit configured to control a display device to display a part of an image; and a detection unit configured to detect an orientation change of the display device, wherein the display control unit performs first processing relating to changing a position of a part of the image displayed according to the orientation change if the detected orientation change is a pitch or a yaw, and performs second processing relating to reproduction of the image, the second processing being different from the first processing, if the detected orientation change is a roll.

According to the present invention, it is possible to perform an operation for reproduction-related processing, which is not the display position change processing, in a state where the apparatus is mounted on the head to ensure high immersion feeling and a sense of presence and the like.

Further features of the present invention will become apparent from the following description of exemplary embodiments with reference to the attached drawings.

BRIEF DESCRIPTION OF THE DRAWINGS

FIGS. 5A and 5B show an example of setting items according to the present embodiment.

DESCRIPTION OF THE EMBODIMENTS

Figure 1A:
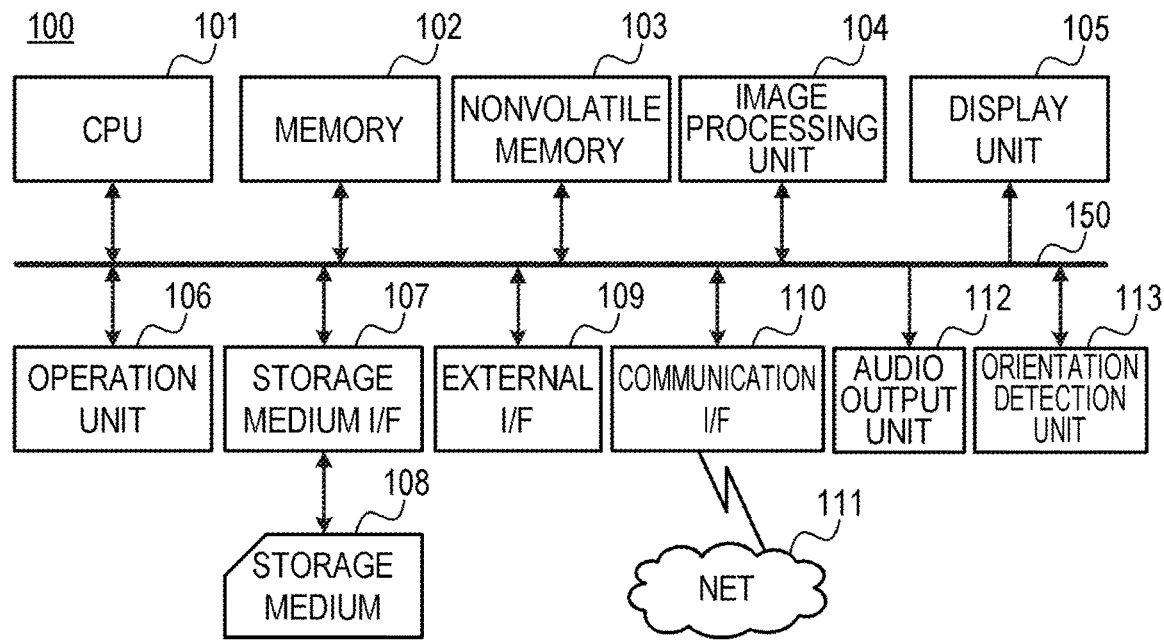
FIG. 1A shows an example of the configuration of an electronic device according to the present embodiment.

Preferred embodiments of the present invention will be described below with reference to the drawings. FIG. 1A shows an example of the configuration of an electronic device 100 as an example of a display control apparatus that can use the present invention. The electronic device 100 can be configured using a display apparatus such as a smartphone.

In FIG. 1A, a CPU 101, a memory 102, a nonvolatile memory 103, an image processing unit 104, a display unit 105, an operation unit 106, a storage medium I/F 107, an external I/F 109, and a communication I/F 110 are connected to an internal bus 150. An audio output unit 112 and an orientation detection unit 113 are also connected to the internal bus 150. The units connected to the internal bus 150 are capable of exchanging data with each other via the internal bus 150.

The CPU 101 is a control unit that controls the entire electronic device 100 and is made up of at least one processor. The memory 102 is composed of, for example, a RAM (a volatile memory using a semiconductor element or the like). The CPU 101 controls each unit of the electronic device 100 by using the memory 102 as a work memory in accordance with, for example, a program stored in the nonvolatile memory 103. The nonvolatile memory 103 stores image data, audio data, other data, various programs for the CPU 101 to operate, and the like. The nonvolatile memory 103 is configured of, for example, a flash memory or a ROM.

Under the control of the CPU 101, the image processing unit 104 performs image processing of an image stored in the nonvolatile memory 103 or the storage medium 108, a video signal acquired via the external I/F 109, an image acquired via the communication I/F 110 and the like. The image processing performed by the image processing unit 104 includes A/D conversion processing, D/A conversion processing, image data encoding processing, compression processing, decoding processing, enlargement/reduction processing (resizing), noise reduction processing, color conversion processing, and the like. In addition, various types of image processing such as panorama expansion, mapping processing, conversion, and the like of omnidirectional images or wide-range images having wide-range data, if not omnidirectional, are performed. The image processing unit 104 may be configured of a dedicated circuit block for performing specific image processing. Further, depending on the type of image processing, the CPU 101 can perform image processing according to a program without using the image processing unit 104.

Under the control of the CPU 101, the display unit 105 displays images, GUI images constituting a GUI (Graphical User Interface) and the like. The CPU 101 generates a display control signal according to a program and controls each unit of the electronic device 100 so as to generate a video signal to be displayed on the display unit 105 and output the video signal to the display unit 105. The display unit 105 displays a video image on the basis of the outputted video signal. The configuration of the electronic device 100 itself may include units up to an interface for outputting a video signal to be displayed on the display unit 105, and the display unit 105 may be configured of an external monitor (a head-mounted display or the like).

The operation unit 106 is an input device for receiving a user operation, the unit including a character information input device such as a keyboard, a pointing device such as a mouse or a touch panel, a button, a dial, a joystick, a touch sensor, a touch pad, and the like. The touch panel is an input device configured to be superimposed on the display unit 105 in planar view and to output coordinate information corresponding to the contacted position.

A storage medium 108 such as a memory card, a CD, and a DVD can be loaded into the storage medium I/F 107, and data are read from the loaded storage medium 108 or written into the storage medium 108 under the control of the CPU 101. The external I/F 109 is an interface for connecting with an external device via a wired cable or wirelessly, and for inputting and outputting a video signal and an audio signal. The communication I/F 110 is an interface for communicating with an external device, an Internet 111, and the like to transmit and receive various data such as files and commands.

The audio output unit 112 outputs sound of moving images and music data, operation sound, incoming sound, various types of notification sound, and the like. The audio output unit 112 includes an audio output terminal 112a for connecting earphones and the like and a speaker 112b, but it is also possible to output audio by wireless communication or the like.

The orientation detection unit 113 detects (senses) the orientation of the electronic device 100 (display unit 105) with respect to the direction of gravity. Based on the orientation detected by the orientation detection unit 113, it is possible to determine whether the electronic device 100 is held horizontally, vertically, upward, downward, or oblique. Whether the electronic device 100 is rotating in a roll direction, or rotating in a pitch direction, or rotating in a yaw direction can be detected by determining whether the electronic device is oriented upward, downward or obliquely. It is also possible to detect the rotation angle with respect to each rotation direction. At least one of an acceleration sensor, a gyro sensor, a geomagnetic sensor, a direction sensor and the like can be used as the orientation detection unit 113, and a plurality of such sensors can be used in combination. When the display unit 105 is an external monitor, the orientation detection unit 113 is provided at the display unit 105, and an interface that acquires the detection result of the orientation detection unit 113 is provided at the electronic device 100.

The operation unit 106 includes a touch panel 106a. The CPU 101 can detect the following operation or state on the touch panel 106a.

The fact that a finger or a pen that has not been touching the touch panel 106a newly touched the touch panel 106a, that is, the start of the touch (hereinafter referred to as "touch-down").

A state in which a finger or a pen is touching the touch panel 106a (hereinafter referred to as "touch-on").

The fact that a finger or a pen is moving while touching the touch panel 106a (hereinafter referred to as "touch-move").

The fact that a finger or a pen that has been touching the touch panel 106a has separated from the touch panel 106a, that is, the end of the touch (hereinafter referred to as "touch-up").

A state in which nothing touches the touch panel 106a (hereinafter referred to as "touch-off").

When a touch-down is detected, a touch-on is detected at the same time. After the touch-down, the touch-on is normally continuously detected as long as a touch-up is not detected. Even when a touch-move is detected, the touch-on is detected at the same time. Even if the touch-on is detected, the touch-move is not detected, provided that the touch position has not moved. A touch-off is detected when the touch-up of all the fingers or pens that have been touching on the touch panel is detected.

These operations/states and coordinates of the position where the finger or the pen is touching on the touch panel 106a are notified to the CPU 101 through the internal bus, and the CPU 101 determines what kind of operation (touch operation) has been performed on the touch panel 106a on the basis of the notified information. Regarding the touch-move, the moving direction of a finger or pen moving on the touch panel 106a can also be determined for each vertical component and horizontal component on the touch panel 106a on the basis of a change in position coordinates. When it is detected that the touch-move has been performed over a predetermined distance or more, it is determined that a slide operation has been performed. An operation of moving a finger on the touch panel 106a quickly through a certain distance while the finger is touching on the touch panel 106a and then separating the finger is called a flick. In other words, the flick is an operation of tracing quickly on the touch panel 106a so as to flick the finger. When it is detected that a touch-move is made at a predetermined or higher speed through a predetermined or longer distance and a touch-up is then detected, it can be determined that a flick has been made (it can be determined that a flick has occurred following a slide operation). Further, a touch operation of touching a plurality of points (for example, two points) at the same time and bringing the touch positions close to each other is called pinch-in, and a touch operation of moving the touch positions away from each other is called pinch-out. Pinch-out and pinch-in are collectively referred to as a pinch operation (or simply a pinch). The touch panel 106a may be of any type selected from a resistance film type, a capacitance type, a surface acoustic wave type, an infrared type, an electromagnetic induction type, an image recognition type, an optical sensor type or the like. There are a method of detecting that there is a touch due to contact with the touch panel, and a method of detecting that there is a touch due to the approach of a finger or pen to the touch panel, and either of these methods may be used.

Figure 1B:
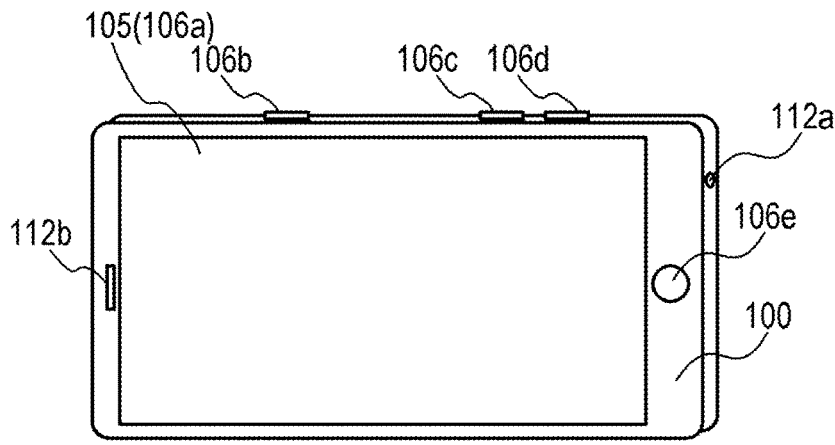
FIG. 1B shows an example of external appearance of the electronic device according to the present embodiment.

FIG. 1B shows an example of external appearance of the electronic device 100. The display unit 105 displays images and various information. As described above, the display unit 105 is configured integrally with the touch panel 106a, and can detect a touch operation on the display surface of the display unit 105. As shown in the figure, the operation unit 106 includes operation units 106b, 106c, 106d, and 106e. The operation unit 106b is a power supply button for receiving an operation of switching on and off the power supply of the electronic device 100. The operation unit 106c and the operation unit 106d are volume buttons for increasing and decreasing the volume of audio output from the audio output unit 112. The operation unit 106e is a home button for displaying the home screen on the display unit 105.

Figure 1C:
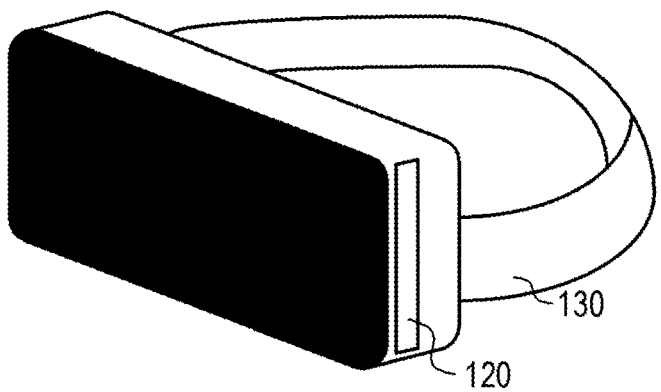
FIG. 1C shows an example of external appearance of a head mount adapter enabling mounting of the electronic device according to the present embodiment.

FIG. 1C shows an example of the external appearance of a head mount adapter which is a VR (Virtual Reality) goggle on which the electronic device 100 can be mounted. The electronic device 100 can also be used as a head-mounted display by being mounted on the VR goggle. An insertion opening 120 is for inserting the electronic device 100. The entire electronic device 100 can be inserted into the VR goggle so that the display surface of the display unit 105 faces the headband 130 side (that is, the user side) for fixing the VR goggle to the head of the user. By mounting the VR goggle on which the electronic device 100 has been mounted in this manner, the user can view the display unit 105 of the electronic device 100, without holding the electronic device 100 by hand, in a state in which the VR goggle is mounted on the head. In this case, when the user moves the head or the entire body, the orientation of the electronic device 100 also changes. The orientation detection unit 113 detects a change in the orientation of the electronic device 100 at this time, and the CPU 101 performs a VR display (VR display processing), which will be described hereinbelow, based on the orientation change. In this case, detecting the orientation of the electronic device 100 with the orientation detection unit 113 is equivalent to detecting the orientation of the head of the user (the direction in which the line of sight of the user is facing).

The electronic device 100 can perform VR display of a VR image (VR contents) on the display unit 105.

It is assumed that the VR image is an image suitable for performing the VR display. The VR image is assumed to be inclusive of an omnidirectional image (entire celestial sphere image) captured by an omnidirectional camera (entire celestial sphere camera) and a panoramic image having a wider video image range (effective video image range) than the display range that can be displayed on the display unit 105 at one time. Further, not only images captured by a camera, but even images created using computer graphics (CG) are assumed to be included in VR images (VR contents), provided that the created images can be VR-displayed. The VR images are inclusive not only of still images but also of moving images and live view images (images acquired from a camera in substantially real time). The VR image has a video image range (effective video image range) of the viewing field of 360 degrees in the up-down direction (vertical angle, angle from the zenith, elevation angle, depression angle, altitude angle) and 360 degrees in the left-right direction (horizontal angle, azimuth angle) at maximum. Further, the VR image is also assumed to be inclusive of images which are less than 360 degrees in the up-down direction and less than 360 degrees in the left-right direction, but have a field angle (field of view range) wider that the field angle that can be captured with a usual camera or have a video image range (effective video image range) wider than the display range that can be displayed at the display unit 105 at one time. For example, an image captured by an entire celestial sphere camera capable of capturing the image of an object with a field of view (field angle) of 360 degrees in the left-right direction (horizontal angle, azimuth angle) and 210 degrees of a vertical angle centered on a zenith is also a VR image. That is, an image having a video image range of a field of view of 180 degrees (±90 degrees) or more in each of the up-down direction and the left-right direction, and a video image range wider than a range that a human can see at a time is a VR image. When the VR image is VR displayed, by changing the orientation in the left-right rotation direction, it is possible to view a seamless omnidirectional video image in the left-right direction (horizontal rotation direction). In the up-down direction (vertical rotation direction), a seamless omnidirectional video image can be viewed in the range of ±105 degrees when viewed from just above (zenith), but the range exceeding 105 degrees from just above becomes a blank area where not video image is present. The VR image can also be said to be "an image for which the video image range is at least a part of a virtual space (VR space)".

The VR display is a display method in which a video image in a field of view range according to the orientation of the electronic device 100 detected by the orientation detection unit 113 in the VR image is displayed and in which a display range can be changed. When the electronic device 100 is viewed upon mounting on a VR goggle, video images in a field of view range corresponding to the orientation of the user's face are displayed. For example, it is assumed that in a VR image, a field of view range (field angle) centered on zero degrees in the left-right direction (specific azimuth, for example, north) and 90 degrees in the up-down direction (90 degrees from the zenith, that is, horizontal) at a certain point in time is displayed. Where the orientation of the electronic device 100 is reversed (for example, when the display surface is changed from the southward orientation to the northward orientation) from this state, the display range is changed to a video image with a viewing angle centered on 180 degrees (the opposite orientation, for example, the southward) in the left-right direction and 90 degrees (horizontal) in the up-down direction of the same VR image. When the user views the electronic device 100 mounted on a VR goggle, where the user points the face from the north to the south (that is, turns to the back), the video image displayed on the electronic device 100 is also changed from that of north to that of south. With such a VR display, it is possible to provide the user with a feeling that the user is visually in the VR image (within the VR space). A method of viewing the VR image with such a VR display (a method of viewing the VR image that provides the user with a feeling that the user is visually in the VR image (within the VR space)) is called "VR viewing".

Figure 2A:
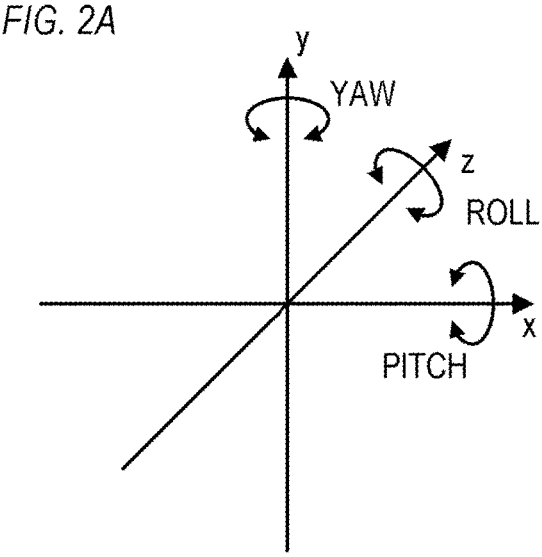
FIGS. 2A to 2D show an example of a rotation direction according to the present embodiment.

FIG. 2A shows an example of the rotation direction of the electronic device 100. In FIG. 2A, the x axis is the axis in the left-right direction of the electronic device 100, the y axis is the axis in the up-down direction of the electronic device 100, and the z axis is the axis in the front-rear direction of the electronic device 100. The x, y and z axes are mutually perpendicular. The initial (reference) orientation of the electronic device 100 is, for example, an orientation in a state where the person wearing the VR goggle faces the front.

As shown in FIG. 2A, the rotation of the electronic device 100 includes "pitch" which is rotation about the x axis, "yaw" which is rotation around the y axis, and "roll" which is rotation around the z axis. The above pitch direction is the rotation direction of the pitch, that is, the direction of rotation around the x axis, the yaw direction is the rotation direction of the yaw, that is, the direction of rotation around the y axis, and the roll direction is the rotation direction of the roll, that is, the direction of rotation around the z axis.

For example, where the person wearing the VR goggle points the face to the upper side or the lower side from the state where the face is directed to the front, a pitch of the electronic device 100 occurs. Where the person wearing the VR goggles points the face to the left side or the right side from the state where the face is directed to the front, a yaw of the electronic device 100 occurs. Where the person wearing the VR goggle tilts the head to the left side or the right side from the state where the face is directed to the front, a roll of the electronic device 100 occurs. In the present embodiment, the counterclockwise roll is described as "left roll" and the clockwise roll is described as "right roll".

Figure 2B:
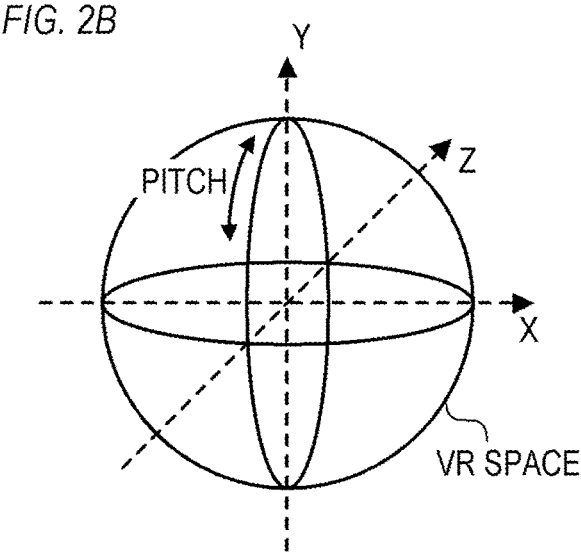
Figure 2C:
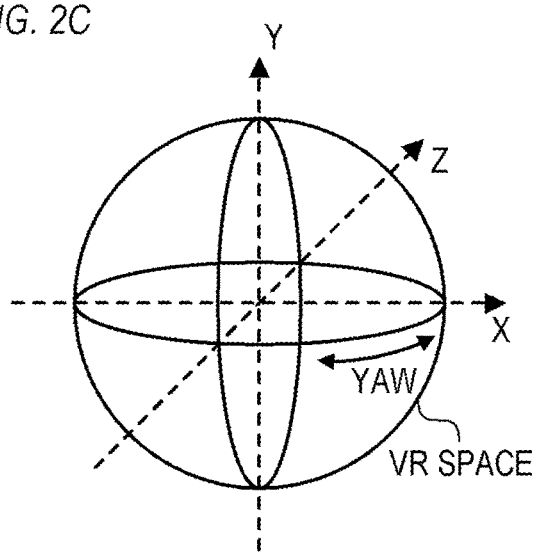
Figure 2D:
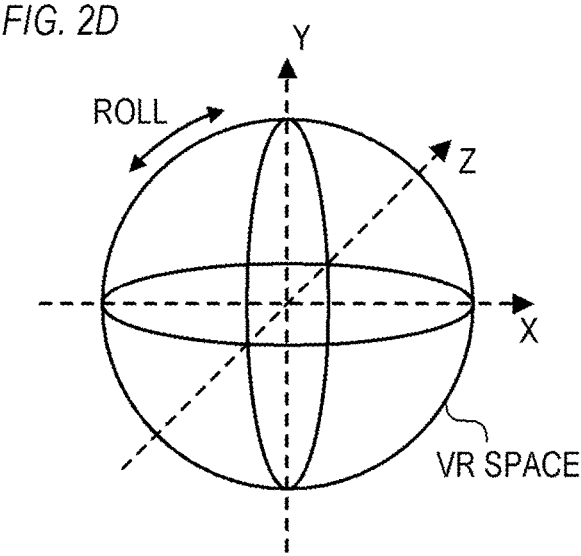

FIGS. 2B to 2D show an example of the rotation direction of the VR space. In FIGS. 2B to 2D, the X axis is the axis in the left-right direction of the VR space, the Y axis is the axis in the up-down direction of the VR space, and the Z axis is the axis in the front-rear direction of the VR space. The rotation of the VR space can be "pitch" (FIG. 2B) which is rotation around the X axis, "yaw" (FIG. 2C) which is rotation around the Y axis, and "roll" which is rotation around the Z axis (FIG. 2D).

Where it is considered that the orientation of the electronic device 100 in the VR space is fixed, a pitch in the direction opposite to the pitch direction of the electronic device 100 occurs in the VR space in response to the pitch of the electronic device 100. A yaw in the direction opposite to the yaw direction of the electronic device 100 occurs in the VR space in response to the yaw of the electronic device 100. A roll in the direction opposite to the roll direction of the electronic device 100 occurs in the VR space in response to the roll of the electronic device 100. For example, when the right roll of the electronic device 100 occurs, a left roll of the VR space is generated.

Figure 3:
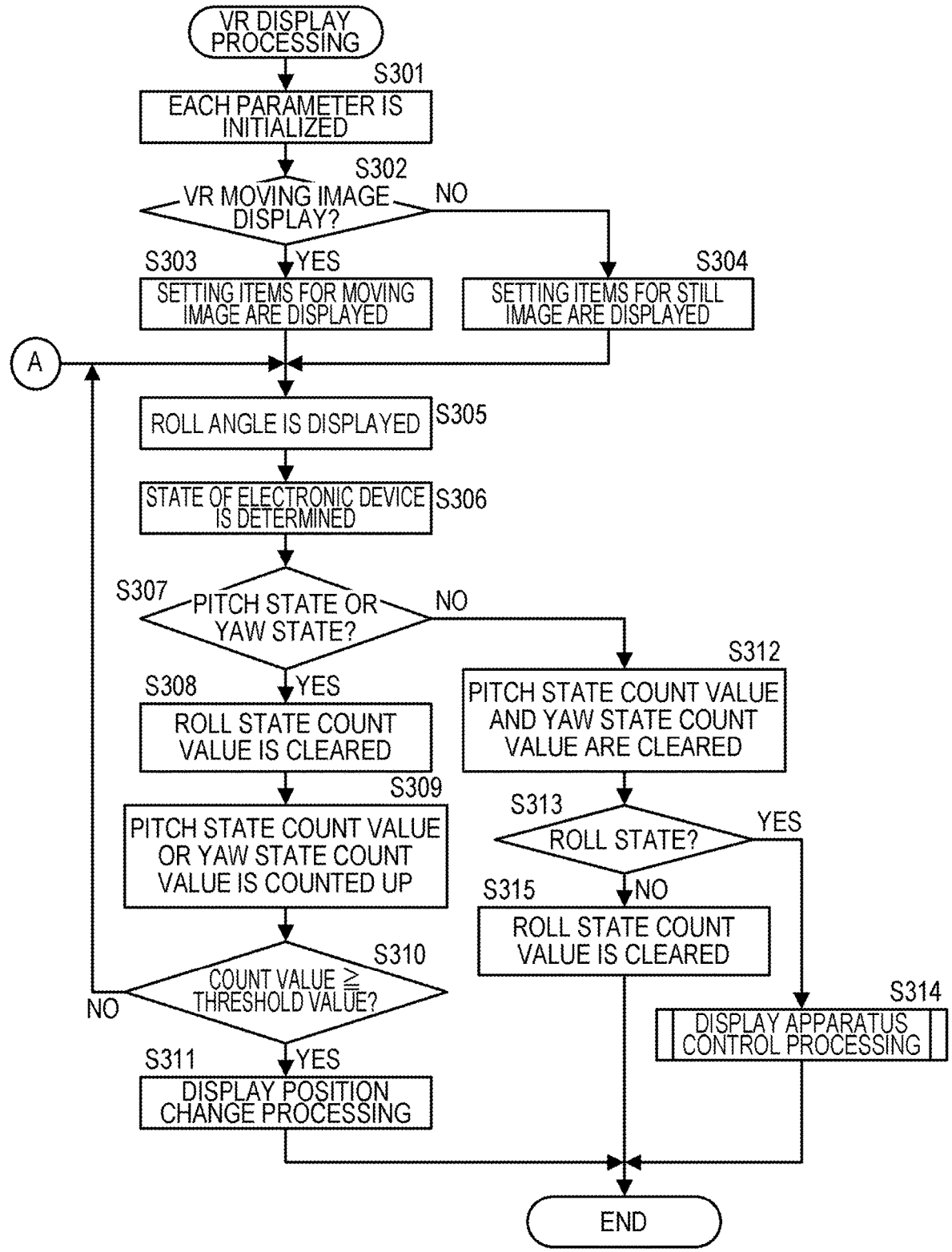
FIG. 3 is a flowchart showing an example of VR display processing according to the present embodiment.

FIG. 3 shows a flowchart of VR display processing performed in the electronic device 100. This processing is realized by expanding the program recorded in the nonvolatile memory 103 in the memory 102 and executing the program by the CPU 101. When the power supply of the electronic device 100 is turned on and a VR image is selected, from among the image recorded on the storage medium 108 and the image acquired from the communication destination, and the range of a part of the VR image is displayed in the VR view, the processing of FIG. 3 is started. The image to be displayed need not be a VR image. Where the range of a part of the image is displayed on the display unit 105 as the display range, the range of a part of the image may not be displayed in the VR view.

In step S301, the CPU 101 initializes each parameter (each parameter to be used for each determination) stored in the memory 102 to zero. In the present embodiment, the CPU 101 determines, at predetermined time intervals, whether the state of the electronic device 100 is a pitch state, a yaw state, a first left roll state, a second left roll state, a first right roll state, a second right roll state, or a stop state. Further, in step S301, a pitch state count value, a yaw state count value, a first left roll state count value, a second left roll state count value, a first right roll state count value, and a second right roll state count value are initialized to zero.

The pitch state is a state after the occurrence of a pitch in which the electronic device 100 rotates through a second angle or more in the pitch direction. For example, a state in which a person wearing a VR goggle is facing upward, a state in which a person wearing a VR goggle is facing downward, and the like. The yaw state is a state after the occurrence of a yaw in which the electronic device 100 rotates through a second angle or more in the yaw direction. For example, a state in which a person wearing a VR goggle is facing the left side, a state in which a person wearing a VR goggle is facing the right side, and the like. The first left roll state is a state after the occurrence of a left roll having a rotation angle of the first angle or more and less than the third angle, and the second left roll state is a state after the occurrence of a left roll having a rotation angle of the third angle or more. The first left roll state and the second left roll state is, for example, a state in which the head of the person wearing the VR goggle is inclined to the left side. The first right roll state is a state after the occurrence of a right roll having a rotation angle of the first angle or more and less than the third angle, and the second right roll state is a state after the occurrence of a right roll having a rotation angle of the third angle or more. The first right roll state and the second right roll state are, for example, states in which the head of the person wearing the VR goggle is inclined to the right side. The stop state is a state different from the pitch state, the yaw state, the first left roll state, the second left roll state, the first right roll state, and the second right roll state. For example, in the stop state, a person wearing a VR goggle is facing the front.

In the present embodiment, an angle smaller than the first angle is used as the second angle. As a result, the pitch state and the yaw state are easier to determine than the first left roll state, the second left roll state, the first right roll state, and the second right roll state.

The pitch state count value is a count value indicating the duration of the pitch state, and the yaw state count value is a count value indicating the duration of the yaw state. The first left roll state count value is a count value indicating the duration of the first left roll state and the second left roll state count value is a count value indicating the duration of the second left roll state. The first right roll state count value is a count value indicating the duration of the first right roll state and the second right roll state count value is a count value indicating the duration of the second right roll state.

In step S302, the CPU 101 determines whether or not the VR image to be displayed is a moving image (VR moving image). Where a VR moving image is determined, the processing proceeds to step S303. Otherwise (in the case where a VR still image is determined), the processing proceeds to step S304.

In steps S303 and S304, the CPU 101 displays on the display unit 105 the display items related to processing different from the display position change processing, among a plurality of reproduction-related processing operations (processing related to reproduction of a VR image 400). Specifically, in step S303, the CPU 101 displays the display items of setting items for moving images on the display unit 105. In step S304, the CPU 101 displays the display items of setting items for still images on the display unit 105.

Figure 4A:
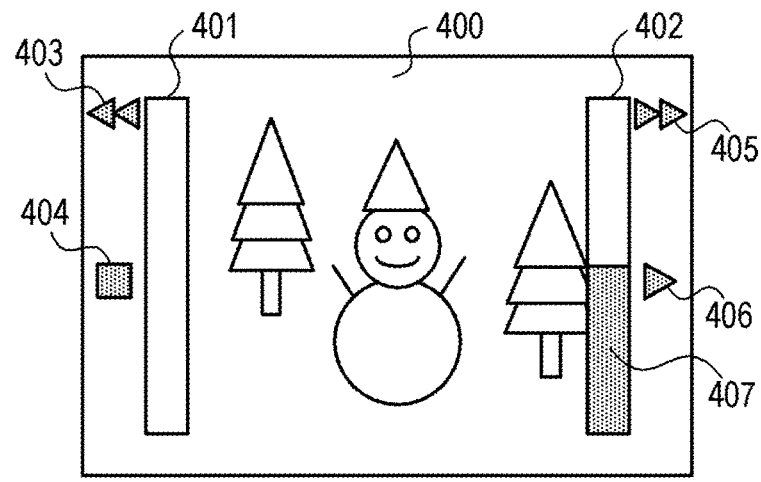
FIGS. 4A to 4C show an example of a display state according to the present embodiment.

FIG. 4A shows an example of the display state of the display unit 105 after step S303 or S304. On the display unit 105, the VR image 400 is displayed, and display items 401 to 406 are displayed on the VR image 400. The display items 401 and 402 are indicators displaying a gauge 407 indicating the rotation angle (roll angle) of the electronic device 100 in the roll direction. The display items 403 to 406 are items indicating setting items of reproduction-related processing different from display position change processing.

FIG. 5A shows an example of setting items for moving images. In the example shown in FIG. 5A, the item indicating the stop of the VR moving image is displayed as the display item 404 in FIG. 4A, and the item indicating the reproduction of the VR moving image is displayed as the display item 406 by the processing of step S303. An item indicating fast-rewind of the VR moving image is displayed as a display item 403, and an item indicating fast-forward of the VR moving image is displayed as the display item 405.

FIG. 5B shows an example of setting items for still images. In the example shown in FIG. 5B, an item indicating the reduction of the VR still image and the multi reproduction, in which a plurality of VR still images is displayed side by side, is displayed as the display item 404 in FIG. 4A by the processing of step S304. An item indicating the enlargement of the VR still image and one-image reproduction, in which one VR still image is displayed, is displayed as the display item 406. An item indicating image backward by which the displayed VR still image is switched to the previous VR still image is displayed as the display item 403, and an item indicating image forward by which the displayed VR still image is switched to the next VR still image is displayed as the display item 405.

In step S305, the CPU 101 displays a gauge 407 shown in FIG. 4A on the indicator 401 or the indicator 402 according to the roll angle of the electronic device 100 detected by the orientation detection unit 113. In the left roll state (the state after the left roll has occurred), the gauge 407 is displayed on the indicator 401, and in the right roll state (the state after the right roll has occurred), the gauge 407 is displayed on the indicator 402. The larger the roll angle is, the higher the gauge 407 is displayed. At the initial orientation (roll angle 0°) of the electronic device 100, the gauge 407 is not displayed. When the roll angle is 50°, the height of the gauge 407 becomes maximum.

In step S306, the CPU 101 determines the state of the electronic device 100 on the basis of the detection result of the orientation detection unit 113. It is determined whether the state of the electronic device 100 is the pitch state, yaw state, first left roll state, second left roll state, first right roll state, second right roll state, or stop state.

In step S307, the CPU 101 determines whether or not the state of the electronic device 100 is the pitch state or the yaw state according to the determination result of step S306. Where the pitch state or the yawing state is determined, the processing proceeds to step S308. Otherwise, the processing proceeds to step S312.

In step S308, the CPU 101 clears the roll state count value (the first left roll state count value, the second left roll state count value, the first right roll state count value, and the second right roll state count value) to zero.

In step S309, the CPU 101 counts up the pitch state count value or the yaw state count value by 1. When the state of the electronic device 100 is the pitch state, the pitch state count value is counted up, and when the state of the electronic device 100 is the yaw state, the yaw state count value is counted up.

In step S310, the CPU 101 determines whether or not the count value (pitch state count value or yaw state count value) counted up in step S309 is at least a first threshold value. Where it is determined that the count value is at least the first threshold value, the processing proceeds to step S311. Otherwise, the processing proceeds to step S305. Therefore, when the duration of the pitch state or the yaw state reaches a first threshold value time, the processing proceeds to step S311.

In step S311, the CPU 101 performs a display position change processing of changing the position of the display range of the VR image in accordance with the orientation change of the electronic device 100.

Where the pitch state or the yaw state is not determined in step S307, the CPU 101 clears the pitch state count value and the yaw state count value to zero in step S312.

In step S313, the CPU 101 determines whether or not the state of the electronic device 100 is a roll state in which the rotation angle is at least the first angle in accordance with the determination result in step S306. Where the roll state in which the rotation angle is at least the first angle is determined (the first left roll state, the second left roll state, the first right roll state, or the second right roll state), the processing proceeds to step S314. Otherwise (where a stop state is determined), the processing proceeds to step S315. The first angle is, for example, 15°.

In step S314, the CPU 101 performs a display apparatus control processing. The display apparatus control processing will be described hereinbelow.

In step S315, the CPU 101 clears the roll state count value (the first left roll state count value, the second left roll state count value, the first right roll state count value, and the second right roll state count value) to zero.

Figure 6:
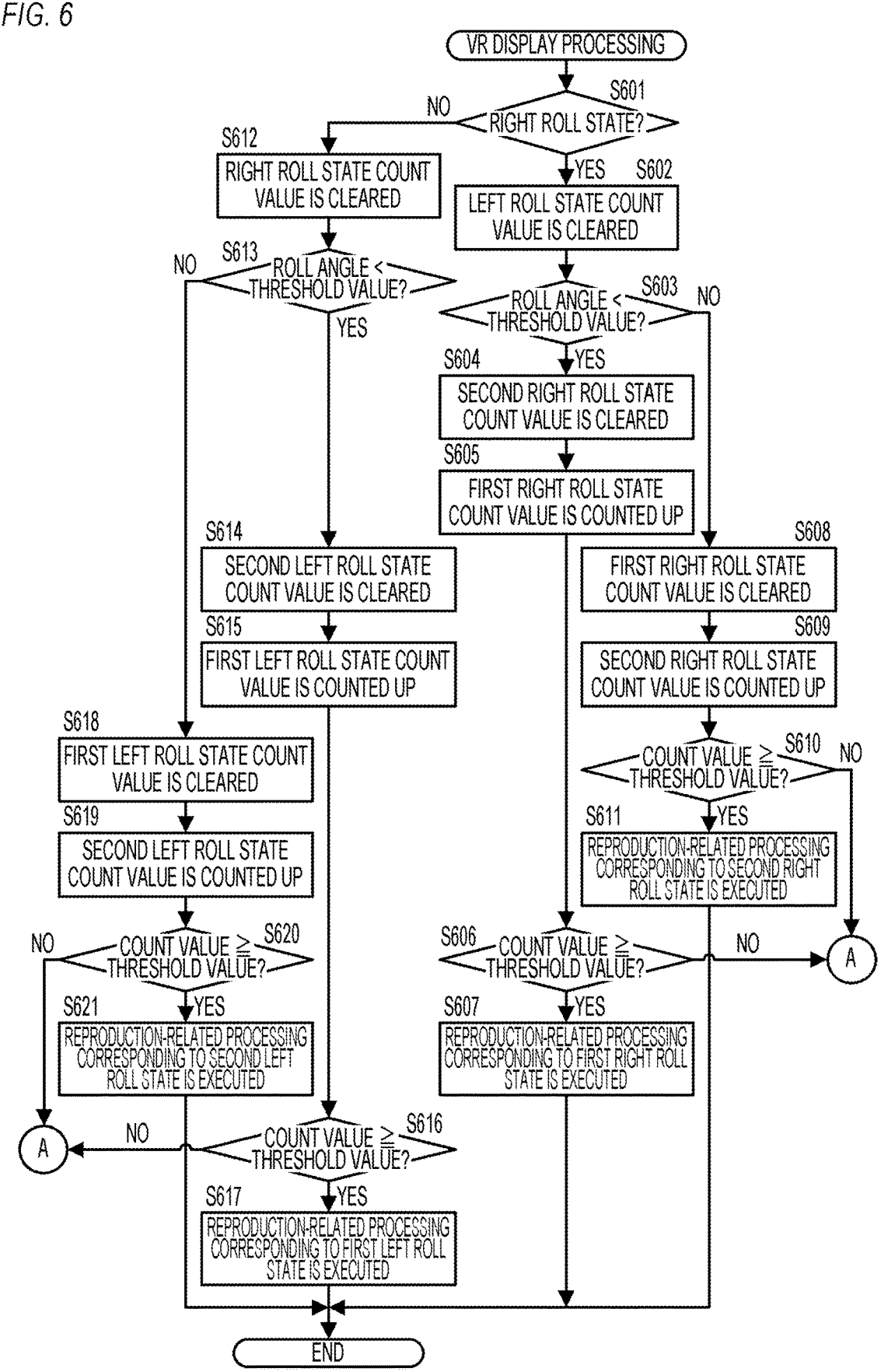
FIG. 6 is a flowchart showing an example of display apparatus control processing according to the present embodiment.

FIG. 6 shows a flowchart of the display apparatus control processing (step S314 in FIG. 3).

In step S601, the CPU 101 determines whether the state of the electronic device 100 is the right roll state in which the rotation angle is at least the first angle in accordance with the determination result of step S306 in FIG. 3. Where the right roll state in which the rotation angle is at least the first angle is determined (the first right roll state or the second right roll state), the processing proceeds to step S602. Otherwise (where the first left roll state or the second left roll state is determined), the processing proceeds to step S612.

In step S602, the CPU 101 clears the first left roll state count value and the second left roll state count value to zero.

In step S603, the CPU 101 determines whether or not the roll angle of the electronic device 100 is less than a third angle according to the determination result of step S306 in FIG. 3. That is, the CPU 101 determines whether or not the state of the electronic device 100 is the first right roll state. When it is determined that the roll angle is less than the third angle (when the state of the electronic device 100 is the first right roll state), the processing proceeds to step S604. Otherwise (when the state of the electronic device 100 is the second right roll state), the processing proceeds to step S608. The third angle is, for example, 30°.

In step S604, the CPU 101 clears the second right roll state count value to zero.

In step S605, the CPU 101 counts up the first right roll state count value by one.

In step S606, the CPU 101 determines whether or not the first right roll state count value is at least a second threshold value. Where it is determined that the first right roll state count value is at least the second threshold value, the processing proceeds to step S607. Otherwise, the processing proceeds to step S305 in FIG. 3. Therefore, when the duration of the first right roll state reaches the second threshold value time, the processing proceeds to step S607.

In step S607, the CPU 101 performs the reproduction-related processing of the setting item corresponding to the first right roll state. Here, it is assumed that the setting items in FIGS. 5A and 5B are used. Reproduction is performed in the case of VR moving image, and image forward is performed in the case of VR still image.

In the present embodiment, a value larger than the threshold value of the pitch state count value or the yaw state count value (the first threshold value used in step S310) is used as the threshold value of the roll state count value (the second threshold value used in step S606 or the like). Accordingly, the CPU 101 changes the position of the display range, selects an image that is multi-displayed (multi-reproduced), and the like at a reaction speed faster than the reaction speed in selecting the setting items. Further, malfunctions such as erroneous selection of setting items (unintended selection) can be suppressed.

Where it is determined in step S603 that the roll angle is at least the third angle (the state of the electronic device 100 is the second right roll state), in step S608, the CPU 101 clears the first right roll state count value to zero.

In step S609, the CPU 101 counts up the second right roll state count value by one.

In step S610, the CPU 101 determines whether or not the second right roll state count value is at least the second threshold value. Where it is determined that the second right roll state count value is at least the second threshold value, the processing proceeds to step S611. Otherwise, the processing proceeds to step S305 in FIG. 3. Accordingly, when the duration of the second right roll state reaches a second threshold value time, the processing proceeds to step S611.

Figure 4B:
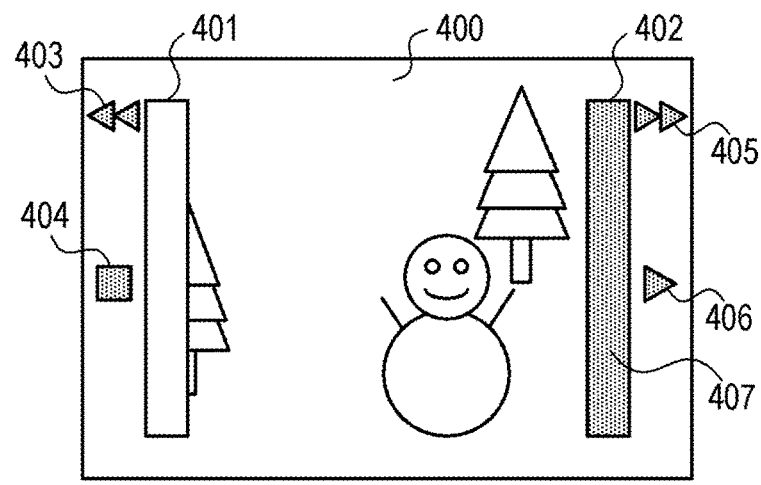

In step S611, the CPU 101 performs the reproduction-related processing of the setting item corresponding to the second right roll state. In the case of a VR moving image, fast-forward is performed, and in the case of a VR still image, enlargement/one-image reproduction is performed. At this time, the display state of the display unit 105 is such as shown in FIG. 4B. In FIG. 4B, the gauge 407 is displayed on the indicator 402 and reaches the position of the display item 405. From such a display state, the user can intuitively grasp that fast-forward, enlargement, one-image reproduction, or the like is performed.

Where the right roll state is not determined in step S601 (where the first left roll state or the second left roll state is determined), in step S612, the CPU 101 clears the first right roll state count value and the second right the roll state count value to zero.

In step S613, the CPU 101 determines whether or not the roll angle of the electronic device 100 is less than the third angle according to the determination result of step S306 in FIG. 3. That is, the CPU 101 determines whether or not the state of the electronic device 100 is the first left roll state. Where it is determined that the roll angle is less than the third angle (the state of the electronic device 100 is the first left roll state), the processing proceeds to step S614. Otherwise (where the state of the electronic device 100 is the second left roll state), the processing proceeds to step S618.

In step S614, the CPU 101 clears the second left roll state count value to zero.

In step S615, the CPU 101 counts up the first left roll state count value by one.

In step S616, the CPU 101 determines whether or not the first left roll state count value is at least the second threshold value. Where it is determined that the first left roll state count value is at least the second threshold value, the processing proceeds to step S617. Otherwise, the processing proceeds to step S305 in FIG. 3. Therefore, when the duration of the first left roll state reaches the second threshold value time, the processing proceeds to step S617.

In step S617, the CPU 101 performs the reproduction-related processing of the setting item corresponding to the first left roll state. In the case of a VR moving image, stop is performed, and in the case of a VR still image, image backward is performed.

Where it is determined in step S613 that the roll angle is at least the third angle (the state of the electronic device 100 is the second left roll state), in step S618, the CPU 101 clears the first left roll state count value to zero.

In step S619, the CPU 101 counts up the second left roll state count value by one.

In step S620, the CPU 101 determines whether or not the second left roll state count value is at least the second threshold value. Where it is determined that the second left roll state count value is at least the second threshold value, the processing proceeds to step S621. Otherwise, the processing proceeds to step S305 in FIG. 3. Accordingly, when the duration of the second left roll state reaches the second threshold value time, the processing proceeds to step S621.

Figure 4C:
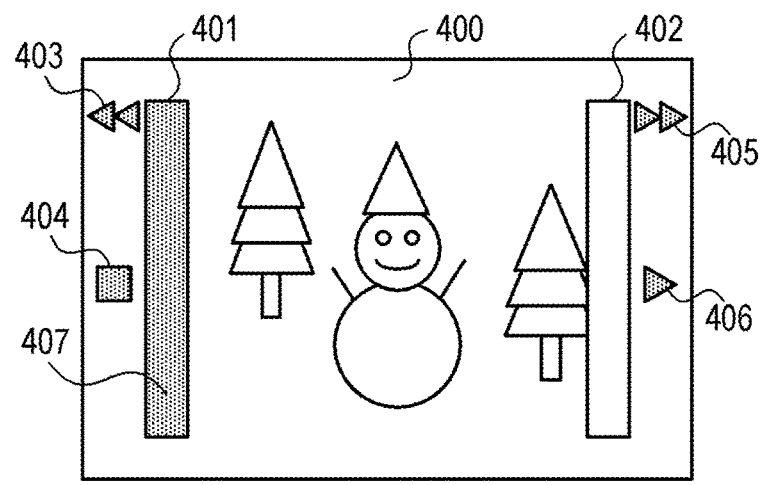

In step S621, the CPU 101 performs the reproduction-related processing of the setting item corresponding to the second left roll state. In the case of a VR moving image, fast-rewind is performed, and in the case of a VR still image, reduction/multi reproduction is performed. At this time, the display state of the display unit 105 is such as shown in FIG. 4C. In FIG. 4C, the gauge 407 is displayed on the indicator 401 and reaches the position of the display item 403. From such a display state, the user can intuitively grasp that fast-rewind, reduction, multi reproduction, or the like is performed.

As described above, according to the present embodiment, when the range of a part of an image is displayed on the display unit as the display range, where the detected orientation change is a pitch or a yaw, the display position change processing for changing the position of the display range is performed according to the orientation change. Further, where the detected orientation change is a roll, reproduction-related processing different from the display position change processing is performed. As a result, operations relating to reproduction can be performed in a state where an apparatus (display unit) is mounted on the head to ensure a high immersion feeling and a sense of presence.

The above-described various kinds of control operations described as being performed by the CPU 101 may be performed by one piece of hardware, or the control of the entire apparatus may be performed by a plurality of pieces of hardware (for example, a plurality of processors and circuits) sharing the processing.

Although the present invention has been described in detail with reference to the preferred embodiments thereof, the present invention is not limited to these specific embodiments, and various embodiments within the scope not deviating from the gist of the present invention are included in the present invention. Furthermore, each of the above-described embodiments merely shows one embodiment of the present invention, and the embodiments can be combined as appropriate.

The reproduction-related processing (setting item to be displayed) executed in response to a roll may be a fixed processing registered in advance in the electronic device 100 or may be arbitrarily changeable. A reproduction-related processing different from reproduction, stop, fast-forward, fast-rewind, enlargement, reduction, one-image reproduction, multi reproduction, image forward, and image backward may be performed in response to the roll. For example, file forward by which the displayed moving image is switched to a moving image of the next file, file backward by which the displayed moving image is switched to a moving image of the previous file, or the like may be executed in response to the roll.

An example has been described in which the first threshold value (first threshold value time) is smaller than the second threshold value (second threshold value time), but the first threshold value may be equal to the second threshold value or may be larger than the second threshold value. The first threshold value and the second threshold value may be larger than zero. An example has been described in which the second angle is smaller than the first angle, but the second angle may be equal to the first angle or may be larger than the first angle. The first angle and the second angle may be larger than zero.

An example has been described in which the position of the display range is not changed when a roll occurs, but the CPU 101 may perform the display position change processing when a roll occurs. An example has been described in which the roll state is not detected in the pitch state and the yaw state, and reproduction-related processing different from the display position change processing is not performed, but the roll state may be detected in the pitch state and the yaw state. Further, when the roll state is detected in the pitch state and the yaw state, reproduction-related processing different from the display position change processing may be performed.

An example has been described in which when the right roll state is detected, processing that is different from the case where the left roll state is detected is performed as the reproduction-related processing, but the reproduction-related processing may be the same when the right roll state is detected and when the left roll state is detected. An example has been described in which when a roll with a rotation angle smaller than the third angle is detected, processing different from that performed when a roll with a rotation angle which is at least the third rotation angle is detected is performed as the reproduction-related processing, but such procedure is not limiting. The reproduction-related processing may be the same when a roll with a rotation angle smaller than the third angle is detected and when a roll with a rotation angle which is at least the third rotation angle is detected.

The timing for displaying the display item related to reproduction-related processing different from the display position change processing is not limited to the above-described timing (step S303 or step S304 in FIG. 3). For example, when the roll state is detected, the CPU 101 may perform control to display, on the display unit 105, a display item related to reproduction-related processing different from the display position change processing. The CPU 101 may perform control to display the display item when the roll state is detected in a state where the display item is not displayed, and may perform reproduction-related processing different from the display position change processing when the roll state is detected in a state where the display item is displayed. When the roll state is detected, the CPU 101 may perform control to display the display item and also may perform reproduction-related processing different from the display position change processing.

The electronic device 100 may acquire the detection result relating to the movement of the electronic device 100 (the display unit 105). Further, when a slide movement in a predetermined direction (forward direction, backward direction, rightward direction, leftward direction, and the like) is detected, the CPU 101 may perform reproduction-related processing different from the display position change processing. For example, when a person wearing a VR goggle moves to the front, back, left, or right, a sliding movement in the same direction as the movement direction of the person is detected as the sliding movement of the electronic device 100.

In the above-described embodiment, an example is explained in which the present invention is applied to the electronic device 100 such as a smartphone, but the present invention is not limited to this example and can be applied to any electronic device that can be controlled so as to display a part of an image. It goes without saying that the present invention can also be applied to a head-mounted display (HMD), rather than a smartphone. Further, the present invention can be also applied to personal computers, PDAs, mobile phone terminals, portable image viewers, printer apparatuses equipped with displays, digital photo frames, and the like. In addition, the present invention can be applied to a music player, a game machine, an electronic book reader, a tablet terminal, a smartphone, a projection apparatus, a household electronic device including a display, a vehicle onboard apparatus, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-072212, filed on Apr. 4, 2018, which is hereby incorporated by reference herein in its entirety.

What is claimed is:

1. An electronic device comprising at least one processor to perform the operations of:
   a display control unit configured to control a display device to display a part of an image; and
   a detection unit configured to detect an orientation change of the display device, wherein the display control unit performs first processing relating to changing a position of a part of the image displayed according to the orientation change if the detected orientation change is a pitch or a yaw and the display device rotates through a first angle or more from an initial orientation to the detected orientation in the pitch or the yaw, and performs second processing relating to reproduction of the image, the second processing being different from the first processing, if the detected orientation change is a roll and the display device rotates through a second angle or more from the initial orientation to the detected orientation in the roll, wherein the first angle from the initial orientation to the detected orientation in the pitch or the yaw is less than the second angle from the initial orientation to the detected orientation in the roll, wherein the display control unit controls the display device to display a display item relating to the second processing if the detected orientation change is the roll and the display device rotates through the second angle or more from the initial orientation to the detected orientation in the roll, and wherein the first angle and the second angle are compared to each other with respect to angle amounts from the initial orientation without regard to a minimum angular threshold.

2. The electronic device according to claim 1, wherein the image is a VR image and
the part of the image is displayed in VR view.

3. The electronic device according to claim 1, wherein the display control unit does not perform the first processing if the detected orientation change is the roll or if the detected orientation change is the pitch or the yaw and the display device rotates less than the first angle from the initial orientation to the detected orientation in the pitch or the yaw.

4. The electronic device according to claim 1, wherein the display control unit does not perform the second processing if the detected orientation change is the pitch or the yaw or if the detected orientation change is the roll and the display device rotates less than the second angle from the initial orientation to the detected orientation in the roll.

5. The electronic device according to claim 1, wherein the second processing is an image forward of a still image, an image backward of a still image, an enlargement of a still image, a reduction of a still image, a file forward of a moving image, a file backward of a moving image, a fast-forward of a moving image, a fast-rewind of a moving image, a reproduction of a moving image, or a stop of a reproduction of a moving image.

6. The electronic device according to claim 1, wherein the display control unit performs the first processing when a duration of an orientation in which the pitch or the yaw is detected reaches a first time, and performs the second processing when a duration of an orientation in which the roll is detected reaches a second time,
the first time being shorter than the second time.

7. The electronic device according to claim 1, wherein the display control unit performs the second processing corresponding to a direction of the detected orientation change being the roll.

8. The electronic device according to claim 1, wherein the display control unit performs the second processing corresponding to an angle of the detected orientation being the roll.

9. The electronic device according to claim 1, wherein if the display item is not being displayed on the display device at a time prior to the time that the orientation change is detected, the display control unit controls the display device to display the display item if the detected orientation change is the roll and the display device rotates through the second angle or more from the initial orientation to the detected orientation in the roll, and while the display control unit performs the second processing if the detected orientation change is the roll and the display device rotates through the second angle or more from the initial orientation to the detected orientation in the roll, the display item is displayed on the display device.

10. The electronic device according to claim 1, wherein the electronic device is a head-mounted display having the display device.

11. A control method for an electronic device, comprising:
displaying a part of an image on a display device;
detecting an orientation change of the display device; and
performing first processing relating to changing a position of a part of the image displayed according to the orientation change if the detected orientation change is a pitch or a yaw and the display device rotates through a first angle or more from an initial orientation to the detected orientation in the pitch or the yaw, and performing second processing relating to reproduction of the image, the second processing being different from the first processing, if the detected orientation change is a roll and the display device rotates through a second angle or more from the initial orientation to the detected orientation in the roll, wherein the first angle from the initial orientation to the detected orientation in the pitch or the yaw is less than the second angle from the initial orientation to the detected orientation in the roll, wherein the display device is controlled to display a display item relating to the second processing if the detected orientation change is the roll and the display device rotates through the second angle or more from the initial orientation to the detected orientation in the roll, and wherein the first angle and the second angle are compared to each other with respect to angle amounts from the initial orientation without regard to a minimum angular threshold.

12. A non-transitory computer readable medium that stores a program, wherein the program causes a computer to execute:
displaying a part of an image on a display device;
detecting an orientation change of the display device; and
performing first processing relating to changing a position of a part of the image displayed according to the orientation change if the detected orientation change is a pitch or a yaw and the display device rotates through a first angle or more from an initial orientation to the detected orientation in the pitch or the yaw, and performing second processing relating to reproduction of the image, the second processing being different from the first processing, if the detected orientation change is a roll and the display device rotates through a second angle or more from the initial orientation to the detected orientation in the roll, wherein the first angle from the initial orientation to the detected orientation in the pitch or the yaw is less than the second angle from the initial orientation to the detected orientation in the roll, wherein the display device is controlled to display a display item relating to the second processing if the detected orientation change is the roll and the display device rotates through the second angle or more from the initial orientation to the detected orientation in the roll, and wherein the first angle and the second angle are compared to each other with respect to angle amounts from the initial orientation without regard to a minimum angular threshold.

\* \* \* \* \*